US010408067B2

United States Patent
Marin

(10) Patent No.: US 10,408,067 B2
(45) Date of Patent: Sep. 10, 2019

(54) TURBOMACHINE BLADE COMPRISING AN INSERT PROTECTING THE BLADE TIP

(71) Applicant: SAFRAN AIRCRAFT ENGINES, Paris (FR)

(72) Inventor: Sebastien Marin, Portsmouth, NH (US)

(73) Assignee: SAFRAN AIRCRAFT ENGINES, Paris (FR)

( * ) Notice: Subject to any disclaimer, the term of this patent is extended or adjusted under 35 U.S.C. 154(b) by 601 days.

(21) Appl. No.: 14/381,840

(22) PCT Filed: Mar. 6, 2013

(86) PCT No.: PCT/FR2013/050478
§ 371 (c)(1),
(2) Date: Aug. 28, 2014

(87) PCT Pub. No.: WO2013/132189
PCT Pub. Date: Sep. 12, 2013

(65) Prior Publication Data
US 2015/0017010 A1 Jan. 15, 2015

(30) Foreign Application Priority Data
Mar. 9, 2012 (FR) ...................................... 12 52150

(51) Int. Cl.
*F01D 5/20* (2006.01)
*F04D 29/32* (2006.01)
(Continued)

(52) U.S. Cl.
CPC ............... *F01D 5/20* (2013.01); *F01D 5/147* (2013.01); *F01D 5/286* (2013.01); *F04D 29/324* (2013.01);
(Continued)

(58) Field of Classification Search
None
See application file for complete search history.

(56) References Cited

U.S. PATENT DOCUMENTS 6,322,323 B1 11/2001 Komiyama et al.
6,908,288 B2 * 6/2005 Jackson ................. F01D 5/005
29/889.1
(Continued)

FOREIGN PATENT DOCUMENTS

CN 1220340 A 6/1999
CN 1619109 A 5/2005
(Continued)

OTHER PUBLICATIONS

Combined Chinese Office Action and Search Report dated Jun. 30, 2015 in Patent Application No. 201380013140.6 (with English language translation and English translation of categories of cited documents).
(Continued)

*Primary Examiner* — Jason D Shanske
*Assistant Examiner* — Jason G Davis
(74) *Attorney, Agent, or Firm* — Oblon, McClelland, Maier & Neustadt, L.L.P.

(57) ABSTRACT

A turbomachine rotor blade, which includes a body radially extending and an insert covering the body tip, the insert being made of a first portion radially covering the blade tip and of a second portion partly covering the intrados face of the blade. The cross-section of the insert along a radial plane with respect to an axis of a rotor is corner-shaped and the first portion of the insert extends tangentially with respect to the main axis of the rotor and the second portion extends globally radially with respect to the main axis of the rotor.

10 Claims, 2 Drawing Sheets

(51) Int. Cl.
   *F01D 5/14*   (2006.01)
   *F01D 5/28*   (2006.01)
(52) U.S. Cl.
   CPC .. *F05D 2240/303* (2013.01); *F05D 2300/133* (2013.01); *Y02T 50/672* (2013.01); *Y02T 50/673* (2013.01)

(56) References Cited

U.S. PATENT DOCUMENTS

| | | |
|---|---|---|
| 2003/0082053 A1 | 5/2003 | Jackson et al. |
| 2005/0106002 A1 | 5/2005 | Gerez et al. |
| 2005/0111967 A1 | 5/2005 | Couture et al. |
| 2008/0159868 A1 | 7/2008 | Kray et al. |
| 2010/0050435 A1 | 3/2010 | Ahmad Zainuddin et al. |
| 2011/0182740 A1 | 7/2011 | Klinetob et al. |

FOREIGN PATENT DOCUMENTS

| | | |
|---|---|---|
| DE | 1 428 165 | 2/1969 |
| EP | 1 312 762 | 5/2003 |
| EP | 2 348 192 | 7/2011 |
| EP | 2 348 192 A2 | 7/2011 |
| GB | 1 107 024 | 3/1968 |
| GB | 2 050 530 | 1/1981 |

OTHER PUBLICATIONS

International Search Report dated May 3, 2013 in PCT/FR13/050478 Filed Mar. 6, 2013.
French Search Report dated Dec. 3, 2012 in French Application No. 12 52150 Filed Mar. 9, 2012.

\* cited by examiner

TURBOMACHINE BLADE COMPRISING AN INSERT PROTECTING THE BLADE TIP

TECHNICAL FIELD

The invention relates to a turbomachine blade, such as a plane turboprop, which is made in order to restrict the markings left by the contact between the blade end and the stator abradable.

The invention more particularly relates to a turbomachine blade comprising a composite material body carrying an insert at the blade tip.

STATE OF THE PRIOR ART

In a turbomachine, such as an aircraft turbomachine, the turbomachine stator comprises an abradable material layer able to be easily worn out upon contacting a movable element, and more particularly upon contacting moving blades which are mounted on the rotor.

This abradable material allows the radial clearance between the blades and the stator to be optimized, in order to restrict air leakages.

During the first commissioning session of the turbomachine, the contact between each blade and the abradable layer causes a progressive wear of the abradable layer.

In a recent turbomachine, the blade is made of composite material, in order to restrict the total weight of the turbomachine and therefore of the aircraft.

Due to this contact between the blade and the abradable layer, it has been noticed that the free end, or tip, of the blade gets covered with certain traces.

These traces are not detrimental to the blade integrity, nor to the good proper operation of the turbomachine. However, these traces are detrimental to the general aesthetic appearance of the turbomachine, which could disturb some people who could question the real solidity of the blades.

The use of inserts on a blade tip is known, especially from EP-A-2.348.192, which describes an insert covering the whole blade tip, as well as the blade leading edge.

Such an insert is quite bulky, it consequently implies an increase in the general weight of the blade. This goes against the lightening process of the general weight of the turbomachine by which the composite material blade has been created.

A purpose of the invention is to provide a blade comprising an insert protecting the blade from markings coming from the wear of the abradable layer, which restricts the weight increase of the blade.

DISCLOSURE OF THE INVENTION

The invention provides a turbomachine rotor blade, which comprises a body extending radially with respect to the main axis of the turbomachine rotor and comprising an outer radial end tip, an intrados face located on the upstream side of the body, in the direction of rotation of the rotor, a leading edge with a radial main orientation, axially located upstream, with respect to the gas flow in the turbomachine, and a trailing edge with a radial main orientation, axially located downstream, with respect to the gas flow in the turbomachine, the blade comprising an insert covering the tip of the body, the insert being comprised of a first portion radially covering the blade tip and a second portion partly covering the intrados face of the blade, The first portion of the insert comprising an edge located on the downstream side of the blade, in the direction of rotation of the rotor, which is levelled with an extrados face of the body, which is located on the downstream side of the body, in the direction of rotation of the rotor, characterised in that the cross-section of the insert along a radial plane with respect to the rotor axis is corner-shaped wherein the first portion of the insert extends tangentially with respect to the main axis of the rotor and the second portion extends globally radially with respect to the main axis of the rotor.

Such a corner-shaped structure of the insert allows the use of the material to form the insert to be restricted, while protecting the blade parts contacting the abradable layer.

Preferably, the second portion of the insert extends throughout the whole axial dimension of the blade, from the leading edge to the trailing edge.

Preferably, the second portion of the insert comprises an intrados face which is levelled with the intrados face of the body.

Preferably, the radial length of the second portion of the insert is equal to or lower than 10 mm.

Preferably, both portions of the insert are made from a single piece.

Preferably, both portions of the insert are made in two distinct pieces.

Preferably, the blade comprises a protecting insert covering at least the leading edge of the body and the upstream axial end of the insert.

The invention also provides a turbomachine comprising a rotor carrying at least a blade according to the invention, and comprising a stator surrounding the rotor, wherein an inner cylindrical wall of the stator, which is axially located at said blade, comprises an abradable material layer radially located at said blade tip, characterised in that the blade comprises an insert which is able to contact the abradable material layer.

BRIEF DESCRIPTION OF THE DRAWINGS

Further characteristics and advantages of the invention will appear upon reading the following detailed description which will be better understood by referring to the accompanying figures among which.

DETAILED DISCLOSURE OF PARTICULAR EMBODIMENTS

Figure 1:
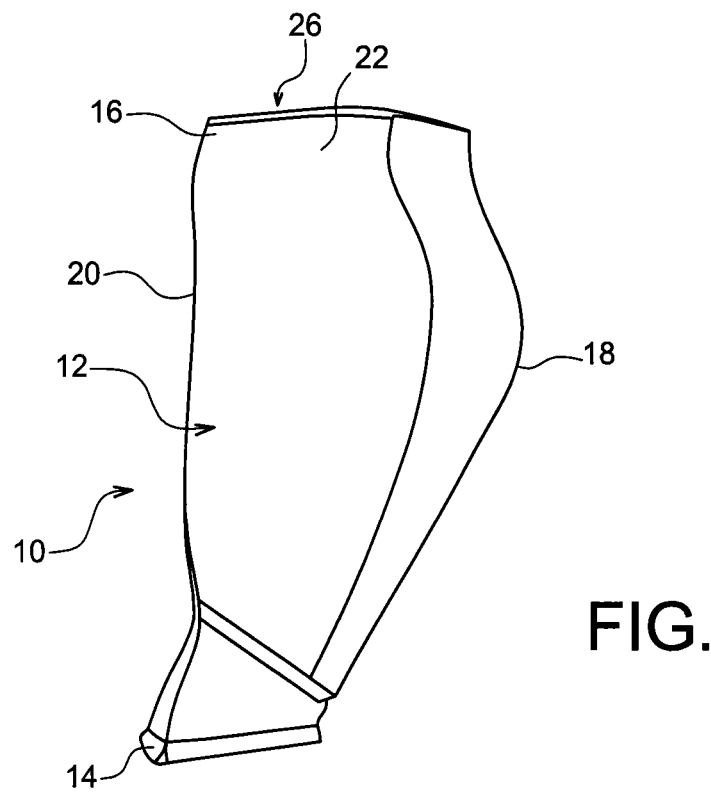
FIG. 1 is a perspective schematic representation of a blade comprising an insert made according to the invention.

FIG. 1 shows a turbomachine blade 10 such as a fan blade for an aircraft turbomachine.

The blade 10 is intended to be mounted on a rotor (not shown) of the turbomachine. In the mounted position, the blade 10 extends in a mainly radially oriented plane with respect to the main axis of the rotor.

In the following description, the blade 10 will be described using this main radial orientation of the blade 10 with respect to the main axis of the turbomachine rotor. Thus, the radial direction corresponds to the top-to-bottom direction referring to FIG. 1 and the axial direction corresponds to the right-to-left direction.

The blade 10 comprises a main body 12 made of composite material, which extends in the main radial plane of the blade 10, with respect to the mains axis of the rotor.

The body 12 comprises a radially inner root 14, which extends along the axial direction and by which the blade 10 is mounted on the rotor according to means known per se. The body 12 also comprises a radially outer tip 16, which is located away from the rotor when the blade 10 is mounted on the rotor and which is intended to operate close to the inner wall of the turbomachine stator (not shown).

The axial end edges of the body 12 extend mainly radially, and respectively consist in a leading edge 18 located on the upstream side of the body 12, along the air flow direction in the turbomachine and which is located on the right side in FIG. 1, and a trailing edge 20 located on the downstream side of the body 12.

The body 12 also comprises an intrados face 22 which is the face located on the upstream side of the body 12, in the direction of rotation of the rotor, and an extrados face 24, which is the face located on the downstream side of the body 12, in the direction of rotation of the rotor.

The blade 10 comprises an insert 26 which is mounted on the body 12 tip 16.

The purpose of the insert 26 is to contact an abradable material layer (not shown) covering the inner wall of the stator, during the first commissioning sessions of the turbomachine, that is during the turbomachine running-in, during which the operating radial clearances between the blades 10 and the stator inner wall are set.

The insert 26 is made of metal, preferably titanium. It is to be understood that the insert can be made of any other metal without departing from the scope of the invention.

Figure 2:
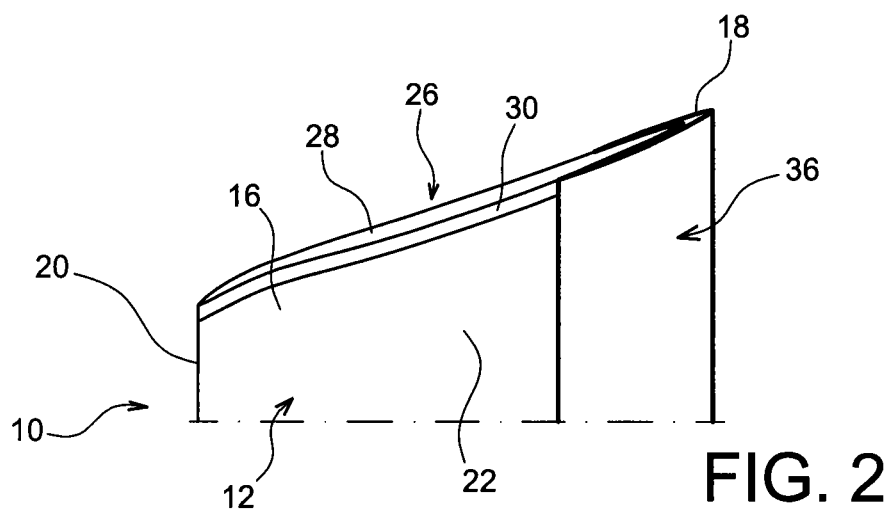
FIG. 2 is a larger scale detail of the radial end of the blade at which the insert is mounted.
Figure 3:
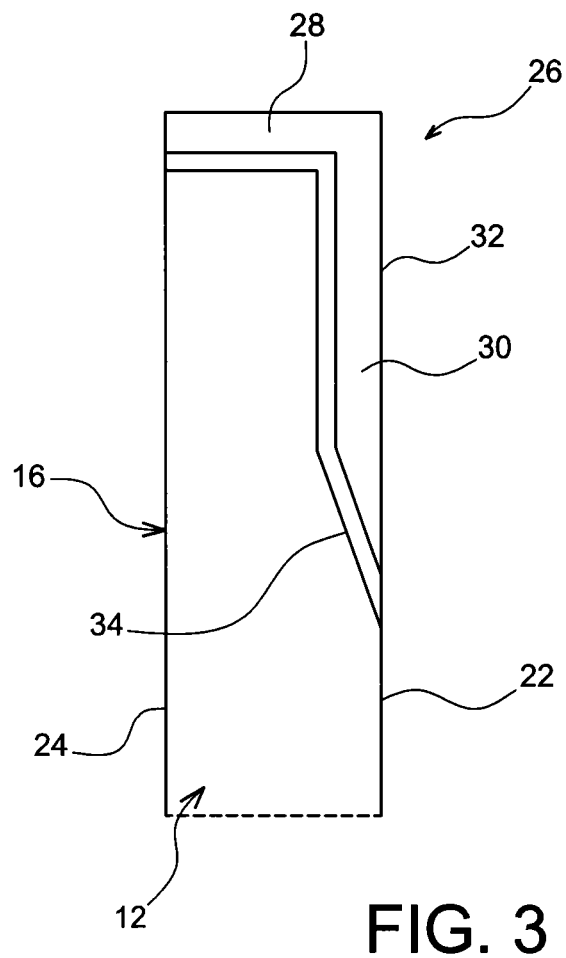
FIG. 3 is a cross-section along a radial plane of the radial end of the blade shown in FIG. 2.

As can be seen in further details in FIGS. 2 and 3, the insert 26 comprises a first portion 28 which radially covers the body 12 tip 16 and a second portion 30 which partly covers the body 12 intrados face 22.

As mentioned above, the body 12 is made of a composite material in order to restrict the total weight of the blade 10 and the insert 26 is made of metal.

In order not to increase too significantly the weight of the blade 10, the dimensions of the insert 26 are reduced as much as possible.

To that end, as shown in FIG. 3, the cross-section of the insert 26, along a radial plane with respect to the axis of the rotor, is corner-shaped and its first insert portion 28 extends tangentially with respect to the main axis of the rotor and its second portion 30 extends globally radially with respect to the main axis of the rotor. The second portion and the first portion form a shape of a convex, inner corner.

The insert 26 is made in order to radially lengthen the body 12 and in order to take part in the aerodynamic action of the blade 10.

To do this, the insert axially extends throughout the axial length of the body 12, that is it axially extends from the leading edge 18 to the trailing edge 20.

The cross-section of the first portion 28 along a tangential plane with respect to the main axis of the rotor, has a shape similar to the shape of the cross-section of the body 12 along a tangential plane, and the radial thickness of the first portion 28 is substantially identical in every respect.

The radial thickness of the first portion 28 of the insert is comprised between a value lower than one millimeter and a value of a few millimeters, such as for example 0.5 mm, 1 mm or 2 mm, and the first portion of the insert extends throughout the thickness of the body 12, that is from the intrados face 22 to the extrados face 24.

The radial length of the second portion 30 of the insert is also small, preferably, the radial length of the second portion 30 is equal to or lower than 10 mm.

Also, the second portion 30 of the insert 26 comprises an intrados face 32, which is levelled with the intrados face 22 of the body 12 and which radially lengthens the intrados face 22 upwards.

The body 12 tip 16 comprises to this end an upper groove 34 which axially extends from the leading edge 18 to the trailing edge 20, in which the second portion 30 of the insert 26 is accommodated.

According to the embodiment shown in the figures, the insert 26 is made in a single piece, that is both portions 28, 30 of the insert 26 are two parts from a single piece.

According to an alternative embodiment not shown, both portions 28, 30 of the insert 26 are made from two different pieces, which are assembled and mounted on the body 12.

The attachment of the insert 26 on the body 12 tip is preferably made by bonding. To do this, an adhesive layer is disposed between the faces facing the body 12 tip 16 on the one hand, and of the portions 28, 30 of the insert 26 on the other hand.

According to another aspect of the blade 10, a second insert 36, also made of metal, covers the leading edge 18 of the blade 10. This second insert allows the blade 10 to be protected from impacts that can be caused for example by bird ingestion by the turbomachine.

As mentioned above, the insert 26 is made so that both portions 18, 30 are levelled with the intrados and extrados faces 22, 24 of the body.

Thus, the insert 26 does not interfere with either the positioning or the attachment of the second insert 36 on the blade 10. The second insert 36 can further cover the insert 26.

The invention claimed is:

1. A turbomachine rotor blade for a turbomachine rotor of a turbomachine, said turbomachine rotor blade comprising:
    a body radially extending with respect to a main axis of the turbomachine rotor;
    a first insert; and
    a second insert,
    wherein the body includes:
        an inner radial root extending along an axial direction;
        an outer radial end tip located away from the turbomachine rotor;
        an intrados face located on an upstream side of the body, in a direction of rotation of the turbomachine rotor;
        an extrados face located on a downstream side of the body, in the direction of rotation of the turbomachine rotor;
        a leading edge with a radial main orientation, axially located on the upstream side of the body, with respect to a gas flow in the turbomachine; and
        a trailing edge with a radial main orientation, axially located on the downstream side of the body, with respect to the gas flow in the turbomachine, wherein the first insert mounted on the outer radial end tip includes:
        a first portion radially covering the outer radial end tip, the first portion parallel to the main axis includes an edge in the direction of rotation of the turbomachine rotor, levelled with the extrados face; and
        a second portion partly covering the intrados face of the body, the second portion including a second intrados face extends globally radially with respect to the main axis, wherein the second intrados face and the first portion form a shape of a convex corner, wherein a cross-section is L-shaped, with the first portion forming a first branch of an L and the second portion forming a second branch of the L; and wherein the second insert covers at least the leading edge and an upstream axial end of the first insert.

2. A turbomachine rotor blade for a turbomachine rotor of a turbomachine, said turbomachine rotor blade comprising:

a body radially extending with respect to a main axis of the turbomachine rotor;

a first insert; and a second insert, wherein the body includes:

an inner radial root extending along an axial direction;

an outer radial end tip located away from the turbomachine rotor;

an intrados face located on an upstream side of the body, in a direction of rotation of the turbomachine rotor;

an extrados face located on a downstream side of the body, in the direction of rotation of the turbomachine rotor;

a leading edge with a radial main orientation, axially located on the upstream side of the body, with respect to a gas flow in the turbomachine; and a trailing edge with a radial main orientation, axially located on the downstream side of the body, with respect to the gas flow in the turbomachine, wherein the first insert mounted on the outer radial end tip includes:

a first portion radially covering the outer radial end tip, the first portion parallel to the main axis includes an edge in the direction of rotation of the turbomachine rotor, levelled with the extrados face;

a second portion partly covering the intrados face extends globally radially with respect to the main axis; and a corner-shaped cross-section along a radial plane with respect to the main axis, the cross-section being L-shaped with the first portion forming a first branch of an L and the second portion forming a second branch of the L, and wherein the second insert covers at least the leading edge and an upstream axial end of the first insert.

3. The rotor blade according to claim 2, wherein the second portion extends throughout a whole axial dimension of the blade, from the leading edge to the trailing edge.

4. The rotor blade according to claim 2, wherein the second intrados face is levelled with the intrados face of the body.

5. The rotor blade according to claim 2, wherein a radial length of the second portion is equal to or lower than 10 mm.

6. The rotor blade according to claim 2, wherein the first and second portions are made from a single piece.

7. A turbomachine comprising:

a rotor carrying at least the blade according to claim 2; and a stator surrounding the rotor, wherein an inner cylindrical wall of the stator, which is axially located at the blade, includes an abradable material layer radially located at the outer radial end tip, and wherein the first insert is configured to contact the abradable material layer.

8. The rotor blade according to claim 2, wherein the outer radial end tip includes an upper groove axially extending from the leading edge to the trailing edge.

9. The rotor blade according to claim 2, wherein the body is made of composite material.

10. The rotor blade according to claim 2, wherein the first insert is made of metal.

* * * * *